UNITED STATES PATENT OFFICE.

EDWARD W. LEGGETT, OF NEW YORK, N. Y.

IMPROVEMENT IN LINING OIL-BARRELS WITH GLUE.

Specification forming part of Letters Patent No. 143,770, dated October 21, 1873; reissue No. 5,785, dated March 10, 1874; application filed January 24, 1874.

*To all whom it may concern:*

Be it known that I, EDWARD W. LEGGETT, of the city, county, and State of New York, have invented an Improved Mode of Coating or Lining the Inside of Barrels, Casks, &c., for the purpose of rendering the same impervious to hydrocarbon oil, or any equivalent material, and thereby improving the barrels, &c., for the purpose designed, of which the following is a specification:

This invention relates to the mode employed for that of coating or lining the inside of barrels, casks, &c., and thereby improving the same, for the above-mentioned purpose; and consists in preparing, from any glutinous substance, glue soup, said soup being permitted to attain but a certain consistency, and then applied directly as a coating or sizing.

In carrying out my invention I proceed as follows: Take any of the materials from which glue may be made, and proceed in the usual or any suitable manner for the manufacture of glue, until the soup has attained a certain consistency.

This consistency must be considerably less than that which is required whereby semi-fluid, solid, or cake glue is to be produced, and while it is in this half-finished state, so to speak, it is applied directly to the inside of the barrel or cask, where, after due evaporation, it will be found that said cask or barrel is lined thoroughly and completely with the material, inasmuch as a pressure of steam generated by heat applied is sufficient to force the thin glutinous fluid or soup well into the pores, fibers, and recesses of the wood, thus insuring a perfect lining.

I am aware that barrels, &c., have been lined or coated with glue of commerce, when said glue has been subjected to a process of reduction by dilution from its original consistency to a sufficiently liquid state; but I am not aware of any process wherein the glutinous material has been permitted to attain only its proper consistency for the purpose specified, and then applied directly, thus saving the time, labor, and expense heretofore employed by continuing the manufacture of the gelatinous soup until it has attained a glutinous condition, thus necessitating a reduction by diluting and reheating before it is fit for application, as set forth in this specification, traveling over, as it were, the same ground backward and forward two or three times, whereas, by my process, this trouble is entirely dispensed with, by operating as within described.

This invention has nothing to do with the ordinary glue-lined barrel, but relates to a new and inexpensive mode or process of making barrels, casks, &c., better adapted to the purpose designed, by coating or sizing, as set forth, than by the ordinary means.

Heretofore glue has been taken in its completed state as an article of manufacture, reheated, diluted, and then applied; but such a process necessarily carries with it all the expense of preparing the glue at first as an article of trade or commerce.

My process contemplates taking the said soup when at a proper consistency and applying it to the inside of the package, permitting it to harden for the first time upon that surface.

The distinguishing feature of this improvement may be found, on examination, to be the superior integrity of the lining by the use of soup glue. By its peculiar character it is more freely absorbed by the wood, penetrating into fiber deeper than by the ordinary mode. Hence the sizing or coating is not only upon the surface, but penetrates into the wood, thereby presenting a thicker covering to the action of the oil, and this sizing is not liable to be broken off or cracked in handling the cask, as part of the coating is absorbed into the fiber and cells of the wood, which gives additional strength to it.

What I claim as my invention, and desire to secure by Letters Patent, is—

1. The within-described process of coating or lining the inside of barrels, casks, &c., wherein the glutinous material, instead of being produced by reduction from a previously solid state, is permitted to attain only a certain liquid consistency, and is then applied to the package and permitted to harden thereon for the first time, substantially as herein set forth and described.

2. A barrel, cask, &c., coated or sized by the material, and by the mode or process, whereby it is absorbed into and strengthened by the wood fiber, substantially as herein described.

EDWARD W. LEGGETT.

Witnesses:

C. W. REED,

A. F. CORNELL.